(12) United States Patent
Toda et al.

(10) Patent No.: US 8,147,945 B2
(45) Date of Patent: *Apr. 3, 2012

(54) DISPLAY AND LABELED ARTICLE

(75) Inventors: Toshiki Toda, Tokyo (JP); Akira Nagano, Tokyo (JP); Shingo Maruyama, Tokyo (JP); Seiko Matsuno, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/592,527

(22) Filed: Nov. 25, 2009

(65) Prior Publication Data
US 2010/0071237 A1 Mar. 25, 2010

Related U.S. Application Data

(63) Continuation of application No. PCT/JP2007/072133, filed on Nov. 14, 2007.

(30) Foreign Application Priority Data

Sep. 28, 2007 (JP) ................................ 2007-254689

(51) Int. Cl.
*B32B 3/26* (2006.01)
(52) U.S. Cl. ........ 428/141; 428/156; 359/570; 359/574; 283/85; 283/93
(58) Field of Classification Search .................. 428/141, 428/156; 359/570, 574; 283/85, 93
See application file for complete search history.

(56) References Cited

U.S. PATENT DOCUMENTS

| | | | |
|---|---|---|---|
| 5,629,070 A | 5/1997 | Korth | |
| 6,369,919 B1 * | 4/2002 | Drinkwater et al. | ............... 359/2 |
| 2004/0239099 A1 | 12/2004 | Tompkin et al. | |
| 2007/0273142 A1 | 11/2007 | Tompkin et al. | |
| 2008/0272883 A1 * | 11/2008 | Toda et al. | ..................... 340/5.8 |

(Continued)

FOREIGN PATENT DOCUMENTS

EP 0 712 012 A1 5/1996

(Continued)

OTHER PUBLICATIONS

Office Action mailed Mar. 30, 2010 in connection with corresponding Japanese Patent Application No. 2009-534145, including an English language translation.

(Continued)

*Primary Examiner* — William P Watkins, III
(74) *Attorney, Agent, or Firm* — John P. White; Cooper & Dunham LLP

(57) ABSTRACT

[Problems] A higher forgery prevention effect is realized.

[Means for Solving Problems] A display according to the present invention is characterized by includes a relief-structured region as an image-constituting element including recessed portions, protruding portions or both of them arranged two-dimensionally on one of main surfaces of a light-transmitting layer, and a reflection layer supported by the one of the main surfaces and covering at least a part of the relief-structured region, wherein a center-to-center distance of the recessed portions, protruding portions or both of them falls within a range of 200 nm to 500 nm. Further, it is characterized in that it comprises multiple relief-structured regions, and a shape, depth or height, the center-to-center distance and an arrangement pattern of the recessed portions, protruding portions or both of them in at least one of the relief-structured regions are different from those in other relief-structured region(s).

12 Claims, 11 Drawing Sheets

U.S. PATENT DOCUMENTS

2010/0080938 A1 * 4/2010 Toda et al. .................. 428/30

FOREIGN PATENT DOCUMENTS

| JP | 2-72320 | 3/1990 |
| JP | 06-67608 A | 3/1994 |
| JP | 06-88905 A | 3/1994 |
| JP | 2004-4515 A | 1/2004 |
| JP | 2005-10230 A | 1/2005 |
| JP | 2005-10231 A | 1/2005 |
| JP | 2005010230 A * | 1/2005 |
| JP | 2009-86648 A | 4/2009 |
| WO | WO 98/10324 | 3/1998 |
| WO | WO 2005/095119 A1 | 10/2005 |

OTHER PUBLICATIONS

International Search Report issued by the International Searching Authority (ISA/JP) on Feb. 12, 2008 in connection with PCT/JP2007/072133, filed Nov. 14, 2007.

Sep. 23, 2010 European search reporting in connection with European patent application No. EP 07 83 1863.

* cited by examiner

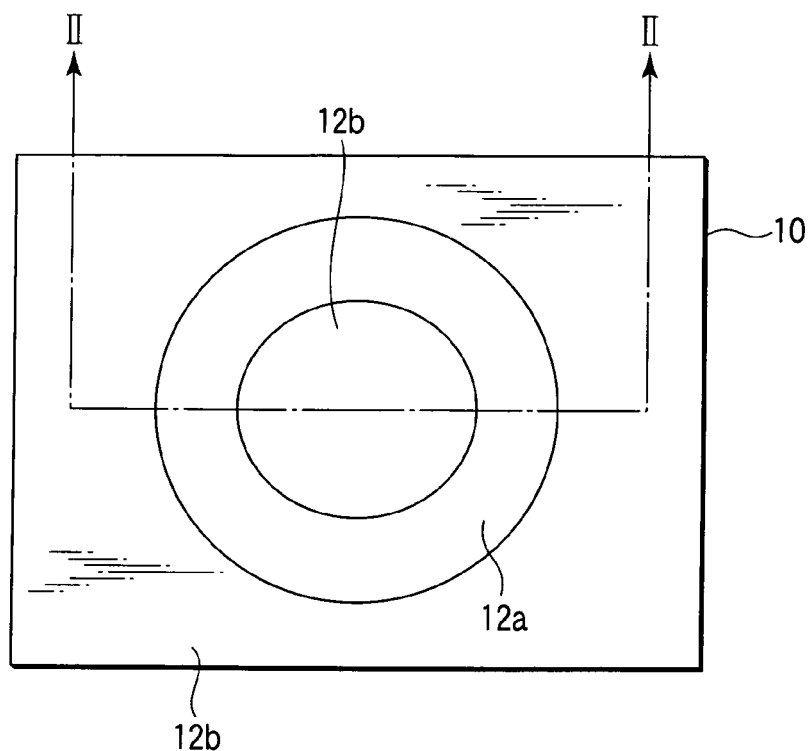
F I G. 1
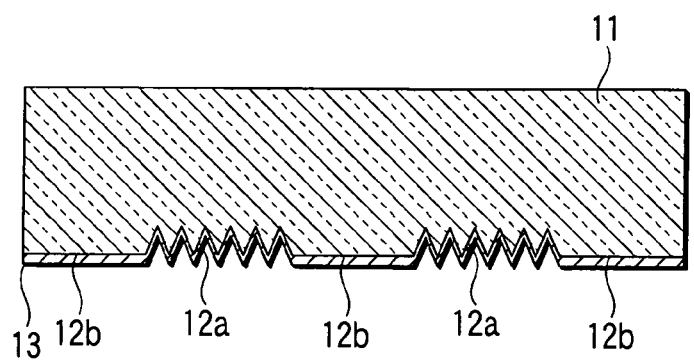
F I G. 2

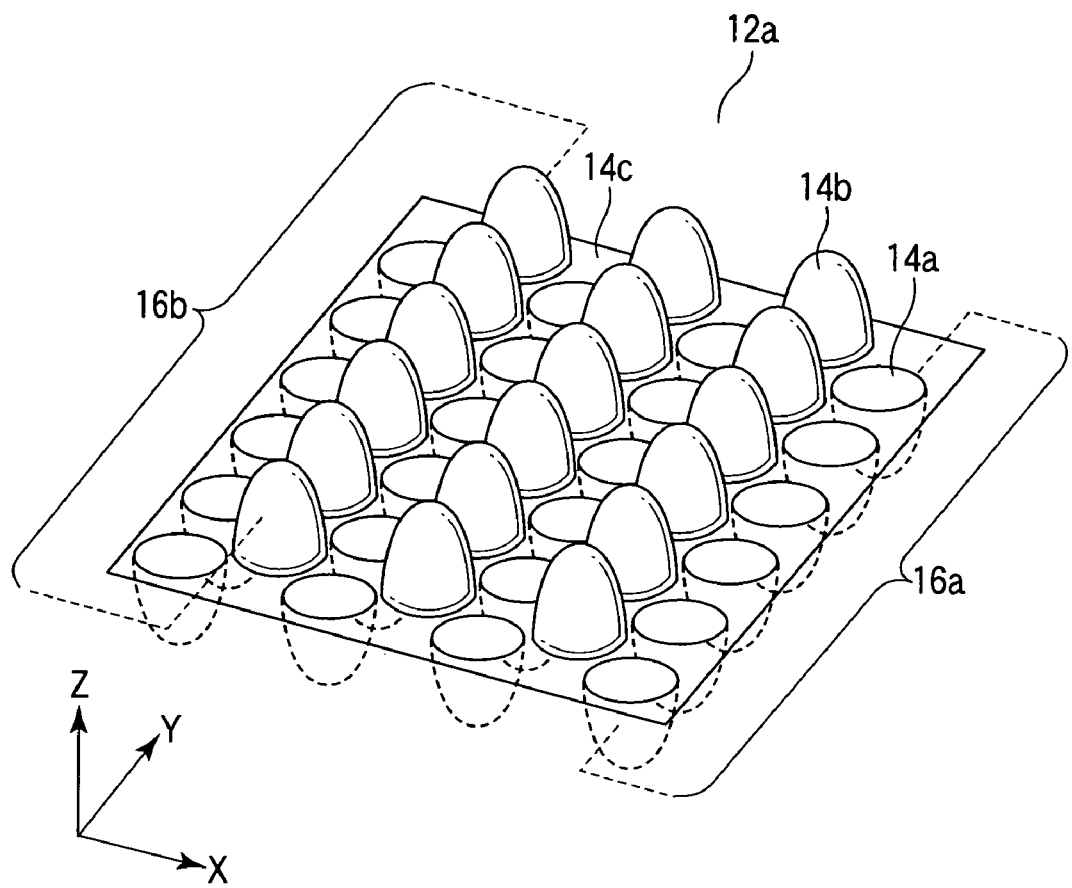
F I G. 7

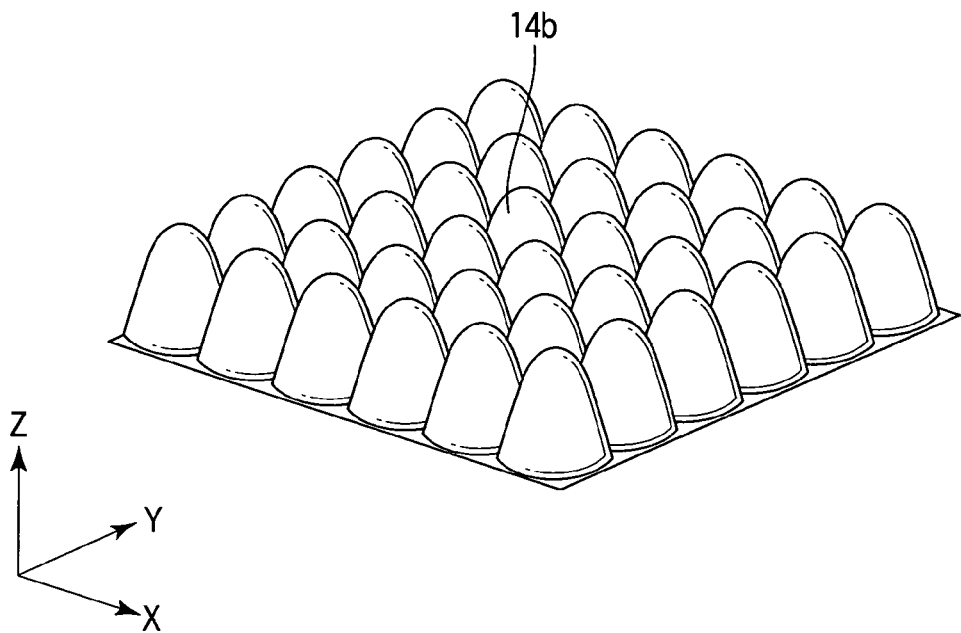
F I G. 14
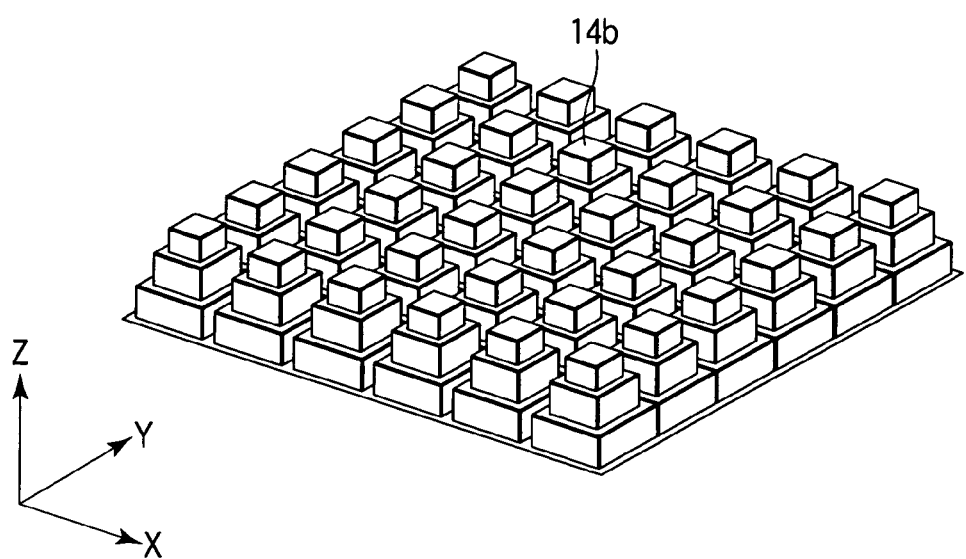
F I G. 15

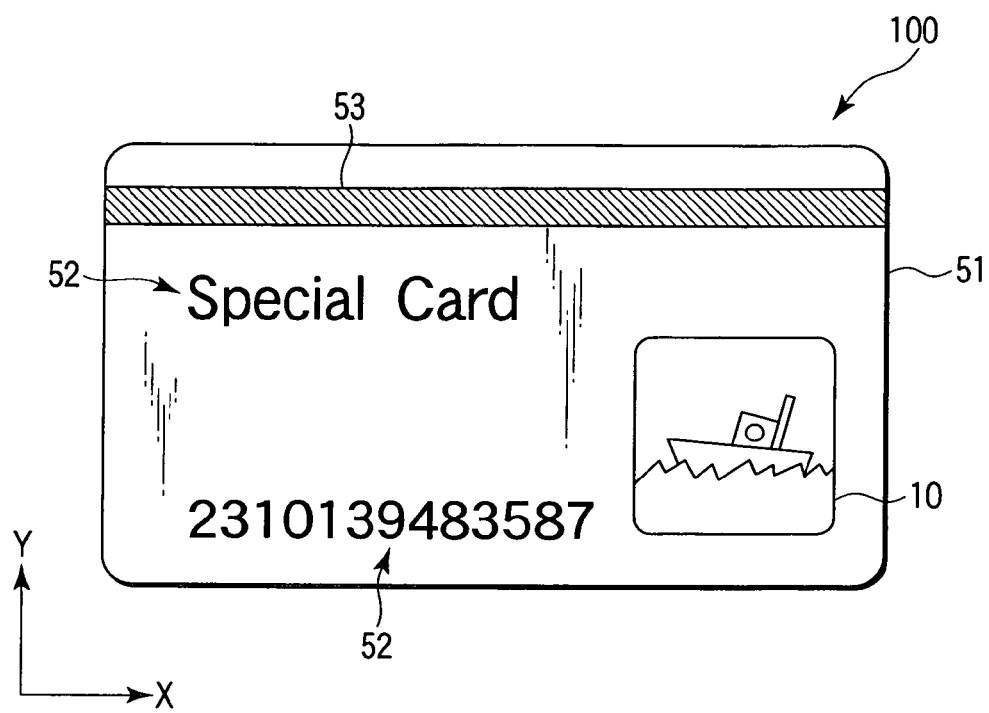
F I G. 16

DISPLAY AND LABELED ARTICLE

CROSS-REFERENCE TO RELATED APPLICATIONS

This is a Continuation Application of PCT Application No. PCT/JP2007/072133, filed Nov. 14, 2007, which was published under PCT Article 21(2) in Japanese.

This application is based upon and claims the benefit of priority from prior Japanese Patent Application No. 2007-254689, filed Sep. 28, 2007, the entire contents of which are incorporated herein by reference.

BACKGROUND OF THE INVENTION

1. Field of the Invention

The present invention relates to a forgery prevention technique.

2. Description of the Related Art

Authentication articles such as cash cards, credit cards and passports and securities such as gift certificates and stock certificates are desired to be difficult of forgery. For this reason, a label which is difficult of forgery or imitation and which makes it easy to distinguish a genuine article from a forged article or an imitated article has conventionally been attached to such an article in order to suppress the forgery.

Further, in recent years, circulation of forged articles is regarded as a problem also for articles other than the authentication articles and securities. For this reason, opportunities have been increasing to apply the forgery prevention technique mentioned for the authentication articles and the securities to such articles.

Patent document 1 describes a display in which multiple pixels are arranged. In this display, each pixel includes a relief-type diffraction grating in which grooves are arranged.

This display displays an image by utilizing diffracted light, and hence it is impossible to forge the display using the printing technique or electrophotographic technique. Accordingly, if this display is attached to an article as a label for authentication, seeing the image displayed on the label makes it possible to confirm that the article is genuine. Therefore, an article to which this label is attached is hardly forged as compared with an article to which this label is not attached.

The above-mentioned relief-type diffraction grating, however, can be formed with comparative ease if a device such as a laser is available. Further, in the above display, although a change in the display image is caused by changing an incident angle of the illumination light, an observation angle or an orientation of the display, the change is not so rich in variety. Therefore, with the development of the technology, the forgery prevention effect of this display is becoming lower. Incidentally, difficulty of forgery or imitation, or ease in distinction of a genuine article from a forged or imitated article is called here a forgery prevention effect.

Patent document 1: Jpn. Pat. Appln. KOKAI Publication No. 2-72320

BRIEF SUMMARY OF THE INVENTION

Problem to be Solved by Invention

An object of the present invention is to realize a higher forgery prevention effect.

Means for Solving Problem

According to a first aspect of the present invention, there is provided a display characterized by comprising a relief-structured region as an image-constituting element including recessed portions, protruding portions or both of them arranged two-dimensionally on one of main surfaces of a light-transmitting layer, and a reflection layer supported by said one of the main surfaces and covering at least a part of the relief-structured region, wherein a center-to-center distance of the recessed portions, protruding portions or both of them falls within a range of 200 nm to 500 nm.

According to a second aspect of the present invention, there is provided a labeled article characterized by comprising the display according to the first aspect, and an article supporting it.

ADVANTAGEOUS EFFECT OF INVENTION

According to the present invention a higher forgery prevention effect can be realized.

DETAILED DESCRIPTION OF THE INVENTION

Embodiments of the present invention will be described below in detail with reference to the accompanying drawings. Incidentally, in the drawings, constituent elements exhibiting the identical or similar function are denoted by the identical reference symbols, and a duplicate description will be omitted.

FIG. 1 is a plan view schematically showing a display according to an aspect of the present invention. FIG. 2 is a cross-sectional view of the display shown in FIG. 1 taken along the line II-II.

This display 10 is constituted by a light-transmitting layer 11 and a reflection layer 13. In the example shown in FIG. 2, one of the main surfaces of the light-transmitting layer 11 includes a relief-structured region 12a and a non-relief-structured region 12b. As will be described later, the relief-structured region 12a is provided with recessed portions, protruding portions or both of them.

Further, on the main surface of the light-transmitting layer 11 that includes the relief-structured region 12a, the reflection layer 13 is formed such that it covers at least a part of the relief-structured region 12a.

As a material for the light-transmitting layer 11, for example, a resin with optical transparency can be used. For example, when a thermoplastic resin or a photo-setting resin is used, it is possible to easily form a light-transmitting layer 11 provided with recessed portions, protruding portions or both of them on one main surface thereof by transfer using a master.

In the case where the display 10 according to the present invention includes both of the light-transmitting layer 11 and the reflection layer 13, damage of surface of the relief-structured region 12a is less prone to occur and an image with a higher viewabillity can be displayed on the display as compared with the case where it includes only one of them.

As the reflection layer 13, for example, a metallic layer made of a metallic material such as aluminum, silver, and alloys thereof can be used. Alternatively, a dielectric material layer with a refractive index different from that of the light-transmitting layer may be used as the reflection layer 13. Further, as the reflection layer 13, a laminated body of dielectric layers in which adjacent layers have different refractive indices, i.e. a multilayered dielectric film, may be used. However, one of the dielectric layers of the dielectric multilayer film that is in contact with the light-transmitting layer 11 needs to have a refractive index different from the refractive index of the light-transmitting layer.

FIG. 3 is a perspective view showing, in an enlarging manner, an example of a structure that can be employed in the relief-structured region 12a of the display shown in FIGS. 1 and 2.

The relief-structured region 12a shown in FIG. 3 is provided with protruding portions 14b. Although the relief-structured region 12a is constituted only by the protruding portions 14b, this is merely an example. In the present invention, the relief-structured region 12a can be constituted by recessed portions or by recessed portions and protruding portions.

Note that the non-relief-structured region 12b is a flat surface.

Next, the special visual effect of the display 10 originated from the relief-structured region 12a will be described.

FIG. 4 is a view schematically showing a state where the relief-structured region 12a emits diffracted light. In FIG. 4, 31 denotes illumination light, 32 denotes regular reflected light or 0-order diffracted light, and 33 denotes 1st-order diffracted light.

In the case where center-to-center distances of the recessed portions, protruding portions or both of them have a constant periodicity, when the relief-structured region is illuminated, the relief-structured region emits diffracted light in a specific direction that depends on a traveling direction of the illumination light as the incident light.

1st-order diffracted light is the most representative diffracted light. An angle of emergence $\beta$ of 1st-order diffracted light can be calculated using the following equation (1).

$$d = m\lambda/(\sin\alpha - \sin\beta) \quad (1)$$

In this formula (1), d represents a center-to-center distance of the recessed portions or protruding portions, and $\lambda$ represents a wavelength of the incident light and the diffracted light. Further, $\alpha$ represents the angle of emergence of the 0-order diffracted light, i.e., the transmitted light or the regular reflected light. In other words, $\alpha$ is equal in absolute value to the incident angle of the illumination light, and is symmetrical to the incident angle with respect to the Z axis (in the case of the reflection-type diffraction grating). Incidentally, as for $\alpha$ and $\beta$, the clockwise direction from the Z axis is the positive direction.

As is evident from the formula (1), the angle of emergence $\beta$ of the 1st-order diffracted light changes according to the wavelength $\lambda$. That is, the relief-structured region has a function as a spectroscope. Accordingly, in the case where the illumination light is white light, when the observation angle is changed, the color perceived by the observer will be changed.

Further, the color perceived by the observer under a certain observation condition changes according to the grating constant d. As an example, it is assumed that the relief-structured region emits 1st-order diffracted light in the normal direction thereof. That is, it is assumed that the angle of emergence p of the 1st-order diffracted light is 0°. Further, it is assumed that the observer perceives this 1st-order diffracted light. When it is assumed that the angle of emergence of the 0-order diffracted light at this time is $\alpha_N$, the formula (1) can be simplified to the following formula (2).

$$d = \lambda/\sin\alpha_N \quad (2)$$

As is evident from the formula (2), in order to allow the observer to perceive a specific color, it suffices that a wavelength $\lambda$ corresponding to the color, an incident angle $|\alpha_N|$ of the illumination light, and a center-to-center distance d are set to satisfy the relationship shown by the formula (2).

As described above, the center-to-center distance of the recessed portions, protruding portions or both of them provided in the relief-structured region 12a falls within a range of 200 nm to 500 nm. Therefore, the reflectance for the regular reflected light 32 with respect to the illumination light 31 can be decreased significantly, and the periodicity of the structure may allow visible light to be emitted as the 1st-order diffracted light 33 in a specific direction depending on the incident angle of the illumination light 31.

Thus, when the display 10 according to the present invention is observed in the normal direction, the relief-structured region 12a is seen black. Here, "black" means that the reflectance for any of the light components within a wavelength range of 400 nm to 700 nm is 25% or less when the display 10 is irradiated with light from the normal direction and the intensity of the regular reflected light is measured. Thus, the relief-structured region 12a is seen as if it is a black printed layer.

In the case where the angle of emergence of the 1st-order diffracted light from the relief-structured region 12a falls within a range of −90° to 90°, if the angle formed by the normal to the display 10 and the observation direction is set appropriately, the observer can perceive the 1st-order diffracted light 33 from the relief-structured region 12a. Thus, in this case, it is possible to check with eyes that the relief-structured region 12a is different from a black printed layer.

That is, the relief-structured region 12a can greatly decrease the reflectance for regular reflected light with respect to incident light and can allow visible light to be emitted as reflection-diffracted light by the periodicity of the structure in a specific direction depending on the incident angle of the incident light. Therefore, under most observation conditions, the relief-structured region 12a is seen black while the regular reflected light 32 from the non-relief-structured region 12b can be observed, and a high-contrast image can thus be displayed.

On the other hand, since diffracted light can be observed under the aforementioned condition where the 1st-order diffracted light 33 can be observed, it is possible to impart an unique visual effect that an image seen black under a normal condition is suddenly seen lucently when changing the observation angle.

Therefore, when the display 10 is used as a label for forgery prevention, a high forgery prevention effect can be achieved.

The master can be formed using a method in which interference fringes are recorded in a photoresist by a laser beam or a method in which micromachining is performed at a constant pitch. Further, when embossing is performed on a thermoplastic resin or a photo-setting resin using the master, the same displays can be manufactured in quantity with a high degree of precision. On the other hand, it is very difficult to analyze the microstructure and the arrangement pattern from the appearance of the display according to the present invention and to manufacture the same display. Thus, its forgery prevention effect is high.

FIGS. 5 and 6 are plan views each schematically showing an example of a display, a display surface of which is constituted by multiple relief-structured regions.

In the display 10 shown in FIG. 5, the display surface is constituted by two relief-structured regions PX1 and PX2 and two non-relief-structured regions PX3 and PX4. The relief-structured region PX1 and the relief-structured region PX2 have different relief shapes. Here, relief shape means a shape, a depth or height, a center-to-center distance and an arrangement pattern of the recessed portions or the protruding portions.

In the display shown in FIG. 5, since two relief-structured regions (PX1 and PX2) are arranged in-plane, it is possible to set a gray-scale and colors of an image and a direction in which an image can be observed by utilizing the optical difference between the two relief-structured regions having different relief shapes (that is the difference in reflectance, diffraction efficiency, angle of emergence and wavelength, i.e., color of diffracted light, etc.). Thus, an image can be displayed with a great visual effect.

In the display 10 shown in FIG. 6, the display surface is constituted by two relief-structured regions PX5 and PX6 and a single non-relief-structured region PX7. The relief-structured region PX5 and the relief-structured region PX6 have different relief shapes.

In the display 10 shown in FIG. 6, relief-structured regions (PX5 and PX6) are arranged adjacent to each other. The diffracted light emitted by one of the relief-structured regions (for example, PX5) is reflected by one of surfaces of the light-transmitting layer 11 that does not have a relief-structured region and then further diffracted by the other relief-structured region (for example, PX6) adjacent thereto. This diffracted light is emitted only from the boundary between the adjacent regions in a direction in which it cannot be emitted only by either of the relief-structured regions (PX5 or PX6). Thus, the boundary between the adjacent regions can be seen lucently like a border. Particularly, even under such an illumination condition where the diffraction angle is to large to allow diffracted light to be observed in a direction almost equal to the normal direction only by either of the relief-structured regions (PX5 or PX6), observation of diffracted light can be made easily. Since this visual effect does not contradict with the aforementioned visual effect, it is possible to obtain a visual effect of switching among the following three states: the state where each of the relief-structured regions (PX5 and PX6) is seen black while the border of the adjacent relief-structured regions (PX5 and PX6) having different relief shapes emits diffracted light in addition to the two states, i.e., black and diffracted light.

FIG. 7 is a perspective view showing, in an enlarging manner, an example of a structure that can be employed in a relief-structured region.

The relief-structured region 12a shown in FIG. 7 includes recessed portions 14a, protruding portions 14b and intermediate portions 14c and has recessed lines 16a formed by the recessed portions 14a and protruding lines 16b formed by the protruding portions 14b. Longitudinal directions (Y direction in FIG. 7) of the recessed lines 16a and the protruding lines 16b are almost the same. The recessed lines 16a and the protruding lines 16b are alternately arranged in a direction (X direction in FIG. 7) crossing the longitudinal direction Y. Although the longitudinal direction Y and the direction X cross at right angles here, it should not be limited such a structure.

Further, the intermediate portions can be omitted.

It should be noted in the case where embossing is utilized for volume production, it is preferable in terms of ease of molding that whole the relief-structured region 12a including the recessed portions 14a and the protruding portions 14b is lower than the main surface.

The recessed line 16a in the present invention is constituted by recessed portions arranged in a line. The recessed line 16a may be a straight line as shown in FIG. 7, a curved line or a serpentine curve. The same is applied to the protruding line 16b of the present invention.

Further, it suffices that the longitudinal directions of the recessed lines 16a and the protruding lines 16b are almost the same. This means that the recessed line 16a and the protruding line 16b adjacent to each other do not intersect each other.

Since the relief-structured region 12a includes the recessed portions 14a and the protruding portions 14b, a lower reflectance can be achieved even when the depth of the recessed portions 14a is made shallower or the height of the protruding portions is made lower as compared with the case where the relief-structured region includes only the recessed portions 14a or the protruding portions 14b. In other words, a deeper black can be displayed without making the depth of the recessed portions 14a deeper or the height of the protruding portions 14b higher.

In addition, since the relief shape is more complicated as compared with the relief-structured region including only the recessed portions 14a or the protruding portions 14b, analysis of the relief shape is more difficult. Thus, the forgery prevention effect is enhanced.

FIG. 8 is a plan view schematically showing a method of manufacturing the relief-structured region 12a including the recessed portions 14a and the protruding portions 14b.

In FIG. 8, the first formation of linear recesses is performed in the Y direction as shown by the broken line-regions L1 to L5. Then, the second formation of linear recesses is performed in the X direction as shown by the broken line-regions L6 to L10. At the intersections of the broken line-regions L1 to L5 and the broken line-regions L6 to L10, the deepest recessed portions 14a (shown in FIG. 8 as black circles) are formed because the formation of recesses is performed twice. At the portions of the broken line-regions L1 to L10 other than the intersections of the broken line regions, intermediate portions 14c whose depth is almost one-half the depth of the recessed portions 14a are formed because the formation of recesses is performed only one time. At the portions outside the broken line-regions L1 to L10 and surrounded by the broken line-regions L1 to L10, protruding portions 14b having no depth (shown in FIG. 8 as white circles) are formed because the formation of recesses does not performed. Specific methods for the formation of recesses include a method of recording an interference pattern into a resist material using a laser and a method utilizing electron beam drawing.

In the master for the relief-structured region 12a formed by the method shown in FIG. 8, the surface of the resist material and the tips of the protruding portions 14b are positioned at the same level. That is, when assuming the level of the intermediate portions 14c is a flat surface as a reference level, the reference level is positioned lower than the surface of the resist material.

However, the relief-structured region 12a is not limited to this. In the relief-structured region 12a including the recessed portions 14a and the protruding portions 14b, the reference level may be positioned at the same level as that of the surface of the resist material or may be positioned higher than it. Further, as described above, the intermediate portions 14c may be omitted.

Note that as for the relief-structured region 12a including the recessed portions 14a and the protruding portions 14b, the depth of the recessed portions 14a and the height of the protruding portions 14b means depth and height from the reference level, respectively.

FIGS. 9 to 12 are plan views each schematically showing an example of arrangement pattern of recessed portions, protruding portions or both of them that can be employed in the relief-structured region 12a.

In FIG. 9, the arrangement of the recessed portions, protruding portions or both of them form a square lattice. This structure can be manufactured comparatively easily by using a micromachining apparatus such as an electron beam drawing apparatus and a stepper, and it is comparatively easy to accurately control the center-to-center distance or the like of the recessed portions, protruding portions or both of them.

Further, in the structure shown in FIG. 9, the recessed portions, protruding portions or both of them are arranged regularly. Accordingly, when the center-to-center distance of the recessed portions, protruding portions or both of them is set 200 nm or more, it is possible to allow the relief-structured region 12a to emit diffracted light. In this case, it is possible to visually confirm that the relief-structured region 12a is different from a black printed layer. Further, when the center-to-center distance of the recessed portions, protruding portions or both of them is set less than 200 nm, emission of diffracted light from the relief-structured region 12a can be prevented. In this case, in terms of the observed color, it becomes difficult to visually confirm that the relief-structured region 12a is different from a black printed layer.

Although the center-to-center distance of the recessed portions, protruding portions or both of them in the X direction and that in the Y direction are made equal to each other in FIG. 9, the center-to-center distances of the recessed portions, protruding portions or both of them may be made different in the X direction and the Y direction. That is, the arrangement of the recessed portions, protruding portions or both of them may form a rectangular lattice.

When the center-to-center distances of the recessed portions, protruding portions or both of them are set comparatively long in both of the X direction and the Y direction, it is possible to allow the relief-structured region 12a to emit diffracted light in both the case where the display 10 is illuminated from a direction perpendicular to the Y direction and the case where the display 10 is illuminated from a direction perpendicular to the X direction, and is possible to make the wavelength of the diffracted light in the former case and that in the latter case different from each other. When the center-to-center distances of the recessed portions, protruding portions or both of them are set comparatively short in both the X direction and the Y direction, it is possible to prevent the relief-structured region 12a from emitting diffracted light regardless of the illumination direction. When the center-to-center distances of the recessed portions, protruding portions or both of them are set comparatively long in one of the X direction and the Y direction, and are set comparatively short in the other of the directions, it is possible to allow the relief-structured region 12a to emit diffracted light when the display 10 is illuminated from a direction perpendicular to one of the Y direction and the X direction, and prevent the relief-structured region 12a from emitting diffracted light when the display 10 is illuminated from a direction perpendicular to the other of the Y direction and the X direction.

In FIG. 10, the arrangement of the recessed portions, protruding portions or both of them forms a triangular lattice. In the case where this structure is employed, as in the case where the structure shown in FIG. 9 is employed, if the center-to-center distance of the recessed portions, protruding portions or both of them is set comparatively long, it is possible to allow the relief-structured region 12a to emit diffracted light, and if the center-to-center distance of the recessed portions, protruding portions or both of them is set comparatively short, it is possible to prevent the relief-structured region 12a from emitting diffracted light.

Further, when the structure shown in FIG. 10 is employed, if the center-to-center distance of the recessed portions, protruding portions or both of them is appropriately set, it is possible to prevent the relief-structured region 12a from emitting diffracted light when the display 10 is illuminated from, for example, the direction A, and allow the relief-structured region 12a to emit diffracted light when the display 10 is illuminated from the direction B or C. That is, a more complicated visual effect can be achieved.

In FIG. 11, the recessed portions, protruding portions or both of them are arranged irregularly. When the recessed portions, protruding portions or both of them are arranged irregularly, emission of diffracted light from the relief-structured region 12a becomes less prone to occur. Incidentally, this structure can be formed by, for example, recording intensity distribution of speckles utilizing interference of light.

In FIG. 12, in addition to the fact that the recessed portions, protruding portions or both of them are arranged irregularly, their sizes are nonuniform. In the case where this structure is employed, emission of diffracted light from the relief-structured region 12a becomes less prone to occur as compared with the case where the structure shown in FIG. 11 is employed.

As exemplified in FIGS. 9 to 12, various modifications can be made to the arrangement pattern of the recessed portions, protruding portions or both of them. Further, each arrangement pattern has its inherent visual effect or the like. Therefore, when the relief-structured region 12a is constituted by pixels different in the arrangement pattern of the recessed portions, protruding portions or both of them from each other, a more complicated visual effect can be achieved.

FIGS. 13 to 15 are perspective views each showing, in an enlarging manner, another example of the relief-structured region that can be employed in the present invention. Although the relief-structured region 12a is constituted only by the protruding regions 14b, this is merely an example. In the present invention, the relief-structured region 12a may be constituted by the recessed portions or recessed portions and protruding portions.

Each structure shown in FIGS. 13 to 15 is a modified example of the structure shown in FIG. 3. Each of the protruding portions shown in FIGS. 13 to 15 has a forward tapered shape. It was revealed that the forward tapered shape makes reflectance of the relief-structured region 12a for the regular reflected light 33 small at any observation angle.

In the structure shown in FIG. 3, the protruding portions 14b have conical shapes. When the recessed portions, protruding portions or both of them are made conical, tips of the recessed portions, protruding portions or both of them may be pointed, or may have a shape of a truncated cone. It should be noted that in the case where the recessed portions, protruding portions or both of them are made pointed conical shape, the recessed portions, protruding portions or both of them have no surface parallel with the relief-structured region, and hence it is possible to make the reflectance of the relief-structured region for the regular reflected light much smaller than that in the case where a shapes of truncated cone is employed.

In the structure shown in FIG. 13, the protruding portions 14b have a shape of a quadrangular pyramid. The recessed portions, protruding portions or both of them may have a shape of a pyramid other than the quadrangular pyramid such as a triangular pyramid. In this case, it is possible to enhance the intensity of diffracted light that occurs under a specified condition, thereby further facilitating observation. Further, when the recessed portions, protruding portions or both of them have a pyramid shape, tips of the recessed portions, protruding portions or both of them may be pointed, or may have a shape of a truncated pyramid. It should be noted that in the case where the recessed portions, protruding portions or both of them have a pointed pyramid shape, the recessed portions, protruding portions or both of them have no surface parallel with the relief-structured region, and hence it is possible to make the reflectance of the relief-structured region for the regular reflected light much smaller than that in the case where the shape of truncated pyramid is employed.

In the structure shown in FIG. 14, the protruding portions 14b have a semi-spindle shape. That is, the recessed portions, protruding portions or both of them have a conical shape rounded at the tip thereof. In the case where the structure shown in FIG. 14 is employed, formation of the recessed portions, protruding portions or both of them on the master and transfer of the recessed portions, protruding portions or both of them from the master to the light-transmitting layer 11 is easier as compared with the case where the structure shown in FIG. 3 or FIG. 13 is employed.

Note that the structure shown in FIG. 7 includes the recessed portions 14a and the protruding portions 14b each of which has a semi-spindle shape.

In the structure shown in FIG. 15, the protruding portion 14b has a structure in which quadrangular prisms having different base areas are stacked one on top of another in the order starting with the one having the largest base area. Incidentally, columnar bodies other than the quadrangular prisms such as cylindrical columns and triangular prisms may be stacked in place of the quadrangular prisms.

In the case where the structure shown in FIG. 15 is employed, it is not possible to make the reflectance of the relief-structured region for the regular reflected light as small as that in the case where the structure shown in FIG. 3, 13, or 14 is employed. However, in the case where the structure shown in FIG. 15 is employed, as in the case where the structure shown in FIG. 14 is employed, formation of the recessed portions, protruding portions or both of them on the master and transfer of the recessed portions, protruding portions or both of them from the master to the light-transmitting layer 11 is easier as compared with the case where the structure shown in FIG. 3 or FIG. 13 is employed.

As described above, the shape of the recessed portions, protruding portions or both of them influences the reflectance of the relief-structured region. Accordingly, when the relief-structured region is constituted by pixels different in the shape of the recessed portions, protruding portions or both of them, a gray-scale image can be displayed on the relief-structured region.

In the present invention, when the center-to-center distance of the recessed portions, protruding portions or both of them is 400 nm or less, it is possible to prevent diffracted light components within a wavelength range of 400 to 700 nm from being emitted by the recessed portions, protruding portions or both of them in the normal direction. According to the equation (2), the light of 400 nm is barely able to travel in the normal direction when illuminated at 89°. Thus, under any illumination condition, the recessed portions, protruding portions or both of them cannot emit diffracted light in the normal direction at sufficient intensity within substantially the whole visible range of wavelength. Therefore, it is possible to make the relief-structured region seen black at a higher degree of reliability when observed in the normal direction. This makes the discrimination between a genuine article and a non-genuine article easier, and the forgery prevention effect is thus enhanced.

When the center-to-center distance of the recessed portions, protruding portions or both of them is 200 nm or more and 350 nm or less, as for the visible wavelength range of 400 to 700 nm, diffracted light corresponding to at least the red component cannot be observed on the relief-structured region. According to the equation (1), light of 700 nm is diffracted in a direction of 89° in the case of the center-to-center distance of 350 nm and the illumination light at 89°. Thus, as for substantially red light, the recessed portions, protruding portions or both of them cannot emit diffracted light in the normal direction at sufficient intensity under any illumination condition. On the other hand, light of 400 nm is diffracted in a direction of 89° in the case of the center-to-center distance of 200 nm and the illumination light at 89°. Thus, it will be understood that blue light is the lower limit for diffraction. Accordingly, in the case where the pitch of the arrangement of the recessed portions, protruding portions or both of them is 200 nm or more and 350 nm or less, when illuminated at a wide angle, diffracted light other than red can be observed at a similar wide angle. Further, under the other conditions, no diffracted light is emitted, and no diffracted light is thus be perceived under ordinary observation conditions. Therefore, it is possible to make the relief-structured region seen black at a higher degree of reliability when observed in the normal direction, and thus make blue or green diffracted light observed under a specific condition. This makes the discrimination between a genuine article and a non-genuine article easier and more reliable, and the forgery prevention effect is thus enhanced.

When the depth of the recessed portions or the height of the protruding portions is made larger, the relief-structured region becomes seen darker. For example, when the depth of the recessed portions or the height of the protruding portions is made equal to or larger than half their center-to-center distance, the relief-structured region becomes seen very dark. Therefore, when the relief-structured region is constituted by pixels different from each other in the depth of the recessed portions or the height of the protruding portions, a gray-scale image can be displayed on the relief-structured region.

When the ratio of a size of the recessed portions or protruding portions in a direction parallel with the relief-structured region to a center-to-center distance of the recessed portions or protruding portions in the same direction as the above direction is made nearer to 1:1, the relief-structured region becomes seen darker. Further, when the size of the recessed portions or protruding portions in the direction parallel with the relief-structured region is made equal to the center-to-center distance of the recessed portions or protruding portions in the same direction as the above direction, the relief-structured region becomes seen darkest. Accordingly, when the relief-structured region is constituted by pixels different from each other in the above ratio, a gray-scale image can be displayed on the relief-structured region.

In the display according to the present invention, it is possible that on one of main surfaces of the light-transmitting layer having the relief-structured region, the reflection layer is to cover at least a part of the relief-structured region, and a resin layer is further formed to cover at least the relief-structured region.

For the resin layer, a resin such as acrylics, urethanes and epoxides can be used. Note that in the case where a part of the relief-structured region is not covered with the reflection layer, it is preferable that its refractive index is the same as the refractive index of the light-transmitting layer, because the effect of the relief structure is cancelled, and the presence and absence of the reflection layer is thus accentuated.

When this is done, it becomes possible to prevent the function of the present invention from being greatly damaged due to inclusion of foreign matter on the surface of the relief-structured region. Thus, using the display according to the present invention, the discrimination between a genuine article and a non-genuine article can be performed with reliability and stability. The reflectance of the reflection layer is less than 100%. Covering the reflection layer's side of the light-transmitting layer with the resin layer increases the refractive index from the refractive index of the air (1.0) to the refractive index of a resin (about 1.4 to 1.6) and thus decreases the reflectance of the interface between the reflection layer and the resin layer. This makes black seen deeper, and the visual effect becomes thus clear.

FIG. 16 is a plan view schematically showing an example of a labeled article including an article supporting a label for forgery prevention or identification. In FIG. 16, a printed matter 100 is depicted as an example of the labeled article. In this case, if the above-mentioned resin layer is an adhesive layer or a sticky layer, it may be realized easily.

This printed matter 100 is a magnetic card, and includes a substrate 51. The substrate 51 is made of, for example, plastic. A printing layer 52 and a band-shaped magnetic recording layer 53 are formed on the substrate 51. Further, a display 10 is adhered to the substrate 51 as a label for forgery prevention or identification. Incidentally, the display 10 has the same structure as that described previously with reference to FIGS. 1, 2, and the like except that the displayed image is different.

This printed matter 100 includes the display 10. Accordingly, as described above, this printed matter 100 is difficult of forgery or imitation. Further, because this printed matter 100 includes the display 10, an article whose genuineness is uncertain can be easily discriminated between a genuine article and a non-genuine article. Moreover, this printed matter 100 further includes the printing layer 52 in addition to the display 10, and hence it is easy to contrast the vision of the printing layer 52 with the vision of the display. Therefore, an article whose genuineness is uncertain can be discriminated between a genuine article and an non-genuine article easier as compared with the case where the printed matter 100 does not include the printing layer 52.

Although in FIG. 16, a magnetic card is exemplified as the printed matter including the display 10, the printed matter including the display 10 is not limited to this. For example, the printed matter including the display 10 may be other types of cards such as a wireless card, an IC (integrated circuit) card, an ID (identification) card, and the like. Alternatively, the printed matter including the display 10 may be securities such as a gift certificate and a stock certificate. Alternatively, the printed matter including the display 10 may be a tag to be attached to an article, which is to be confirmed as a genuine article. Alternatively, the printed matter including the display 10 may be a package or a part thereof for accommodating an article to be confirmed as a genuine article.

Although in the printed matter 100 shown in FIG. 16, the display 10 is adhered to the substrate 51, the display 10 can be supported by the substrate by other methods. For example, when paper is used as the substrate, the display 10 may be embedded in the paper, and the paper may be opened at a position corresponding to the display 10.

Further, it is not necessary for a labeled article to be a printed matter. That is, the display 10 may be supported by an article including no printing layer.

BRIEF DESCRIPTION OF THE SEVERAL VIEWS OF THE DRAWING

FIG. 1 is a plan view schematically showing a display according to an aspect of the present invention;

FIG. 2 is a cross-sectional view of the display shown in FIG. 1 taken along the line II-II;

FIG. 7 is a perspective view showing, in an enlarging manner, another example of a relief-structured region that can be employed in the present invention;

FIG. 14 is a perspective view showing, in an enlarging manner, another example of a relief-structured region that can be employed in the present invention;

FIG. 15 is a perspective view showing, in an enlarging manner, another example of a relief-structured region that can be employed in the present invention; and FIG. 16 is a plan view schematically showing an example of a labeled article including an article supporting a label for forgery prevention or identification.

NOTES ON REFERENCE SYMBOLS

Figure 3:
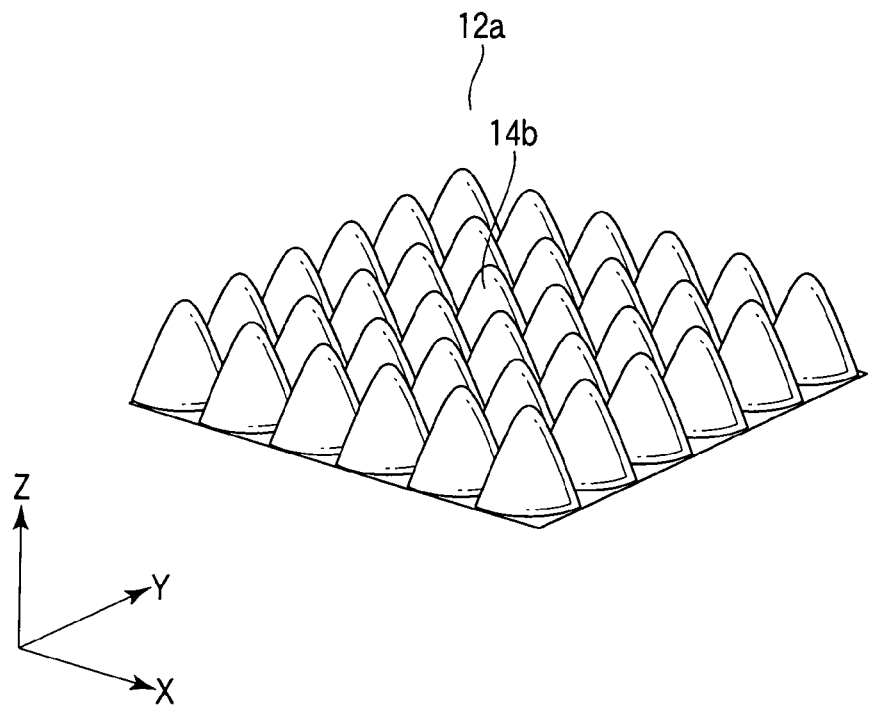
FIG. 3 is a perspective view showing, in an enlarging manner, an example of a structure that can be employed in a relief-structured region of the display shown in FIGS. 1 and 2.
Figure 4:
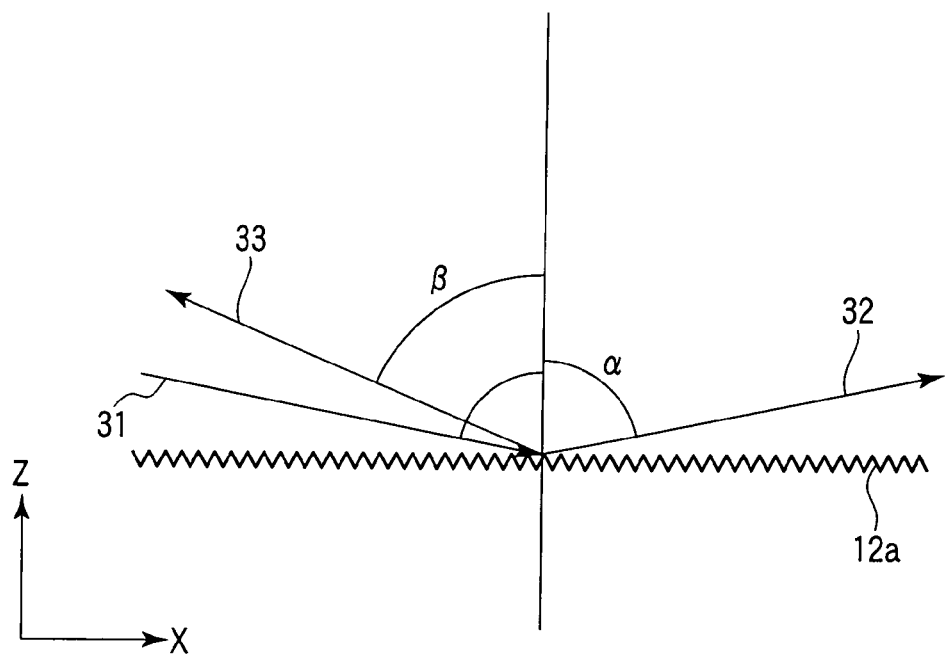
FIG. 4 is a view schematically showing a state where the relief-structured region emits diffracted light.
Figure 5:
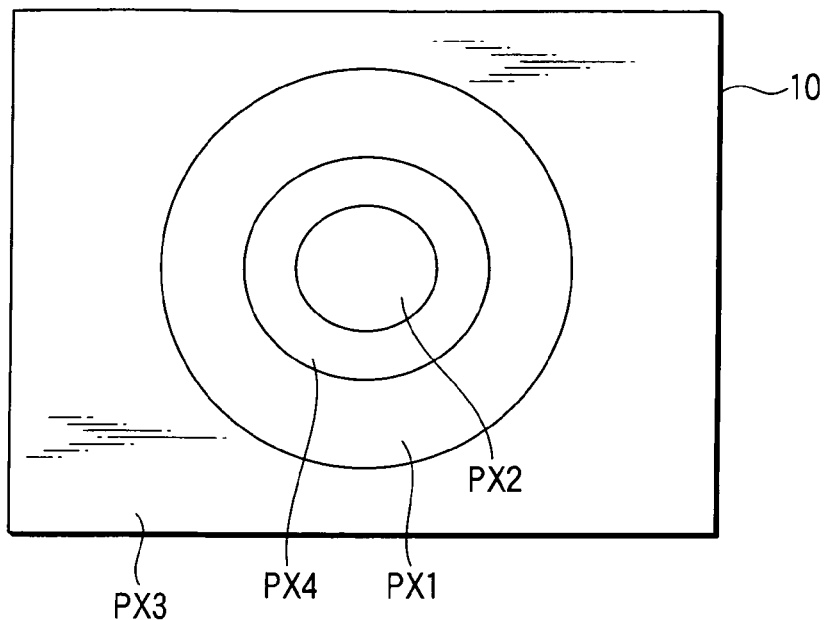
FIG. 5 is a plan view schematically showing an example of a display, a display surface of which is constituted by multiple relief-structured regions.
Figure 6:
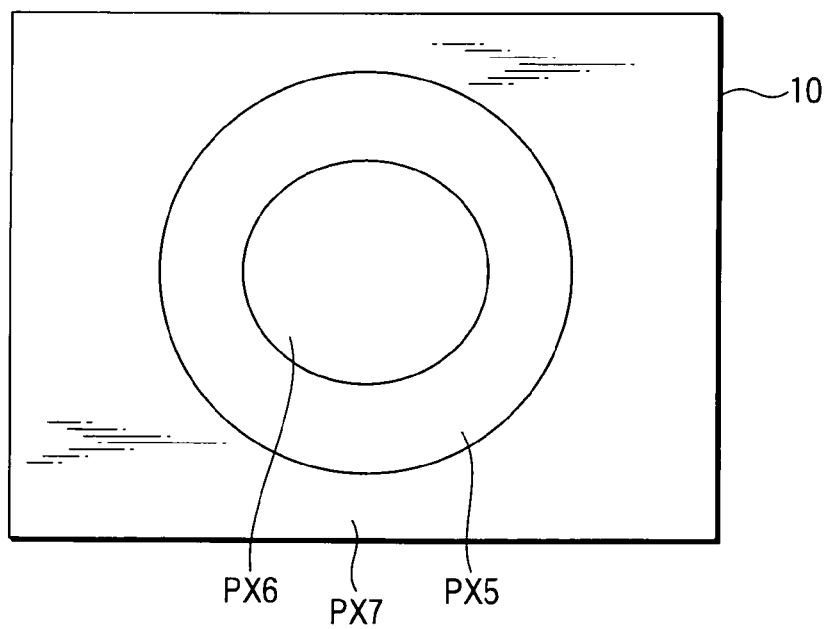
FIG. 6 is a plan view schematically showing another example of a display, a display surface of which is constituted by multiple relief-structured regions.
Figure 8:
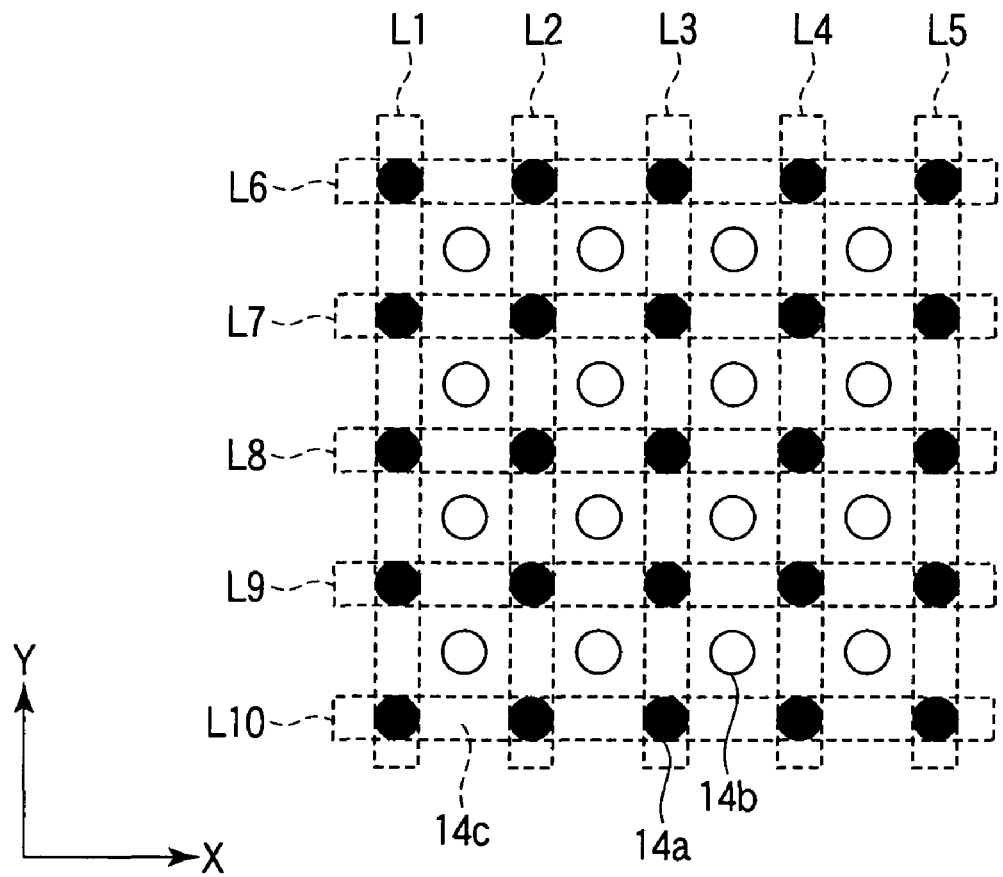
FIG. 8 is a plan view schematically showing a method of manufacturing a relief-structured region including recessed portions and protruding portions.
Figure 9:
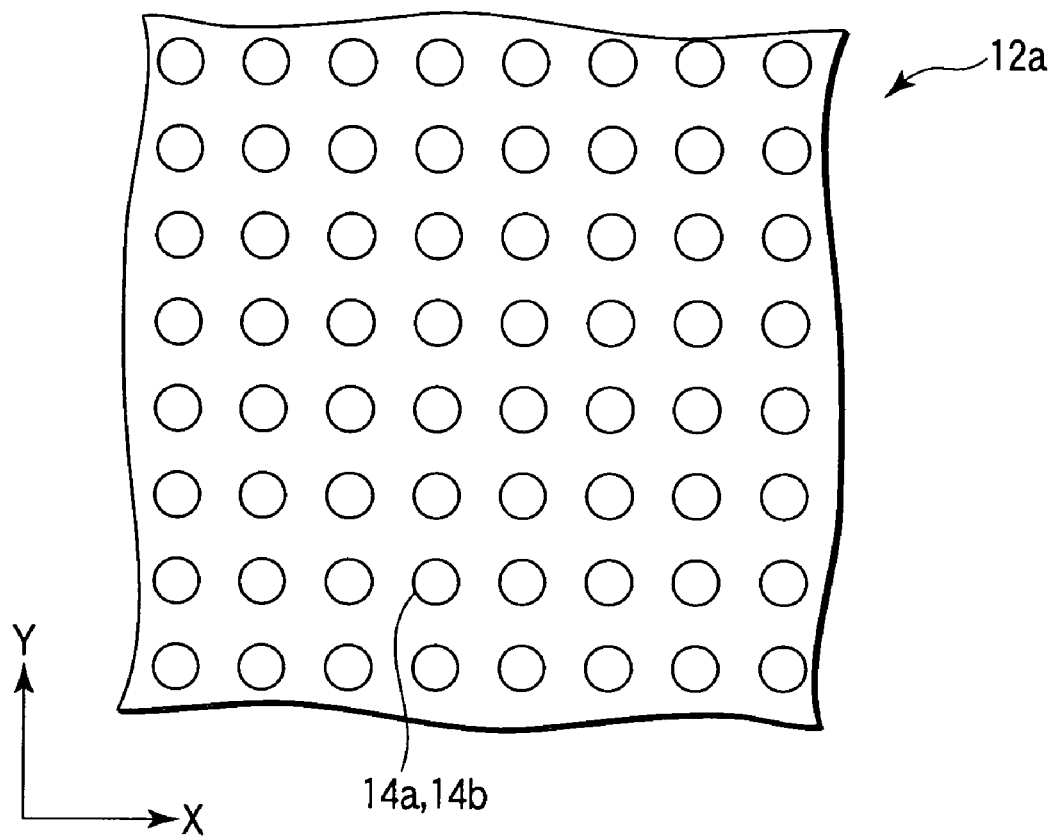
FIG. 9 is a plan view schematically showing an example of arrangement pattern of recessed portions, protruding portions or both of them that can be employed in a relief-structured region.
Figure 10:
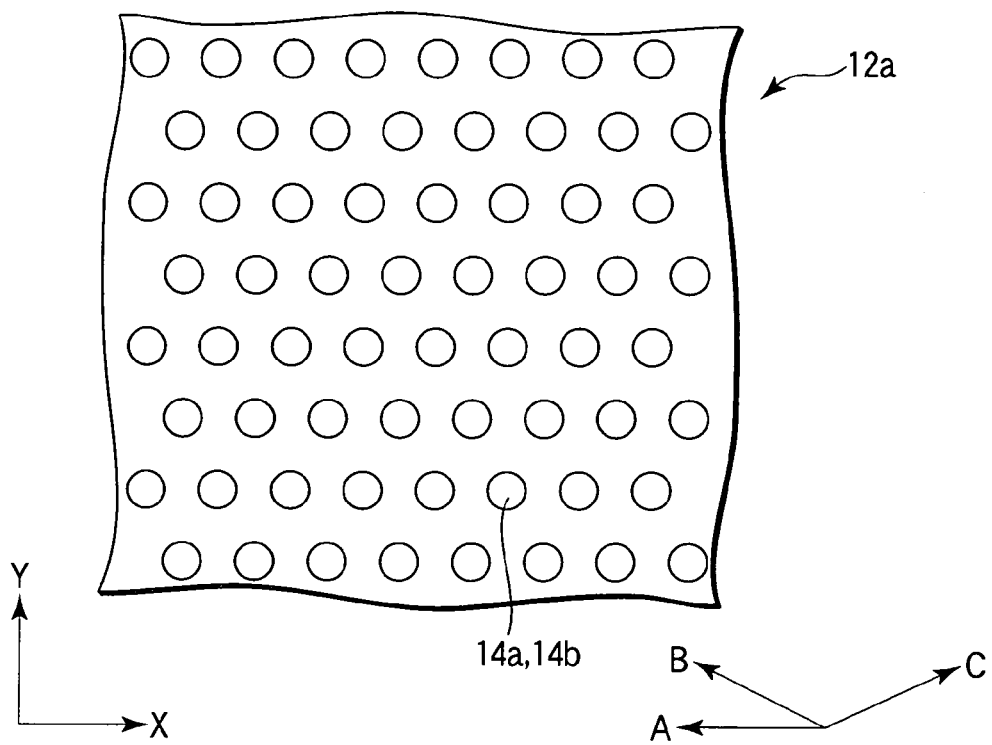
FIG. 10 is a plan view schematically showing another example of arrangement pattern of recessed portions, protruding portions or both of them that can be employed in a relief-structured region.
Figure 11:
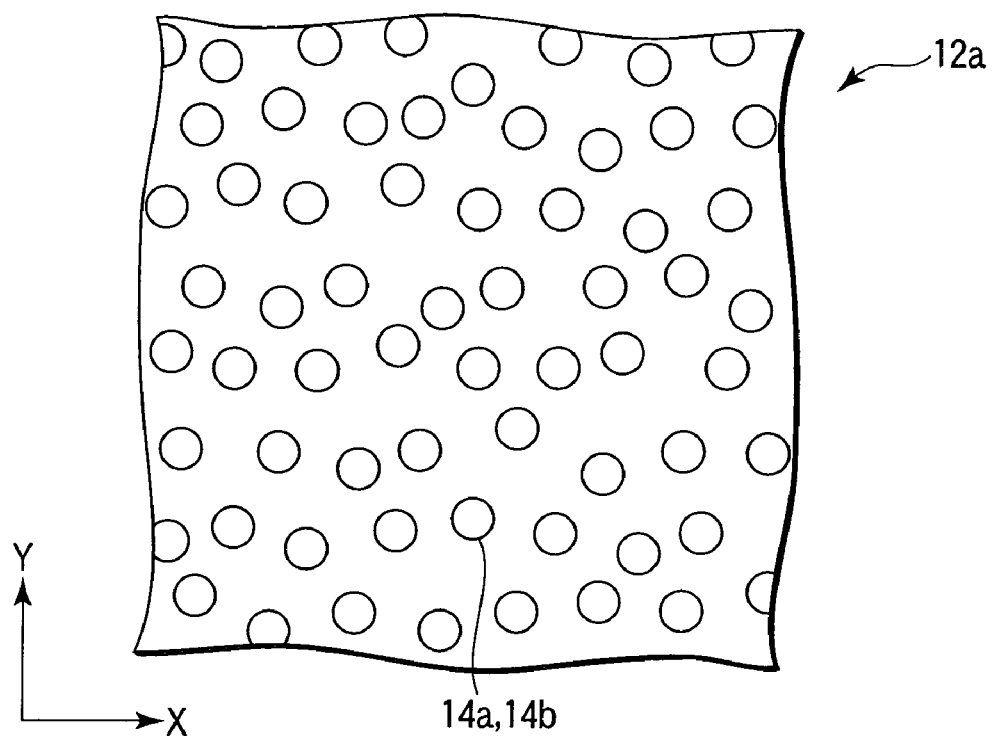
FIG. 11 is a plan view schematically showing another example of arrangement pattern of recessed portions, protruding portions or both of them that can be employed in a relief-structured region.
Figure 12:
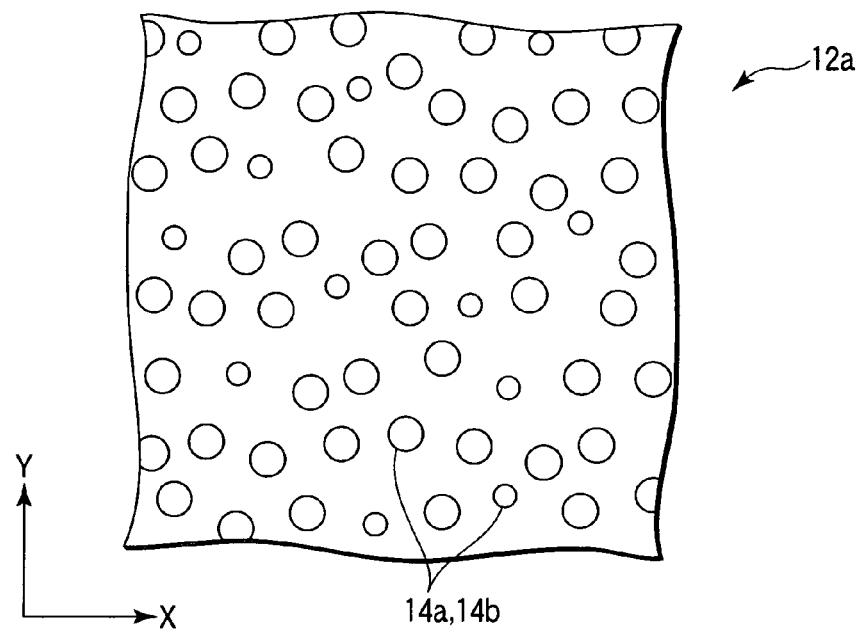
FIG. 12 is a plan view schematically showing another example of arrangement pattern of recessed portions, protruding portions or both of them that can be employed in a relief-structured region.
Figure 13:
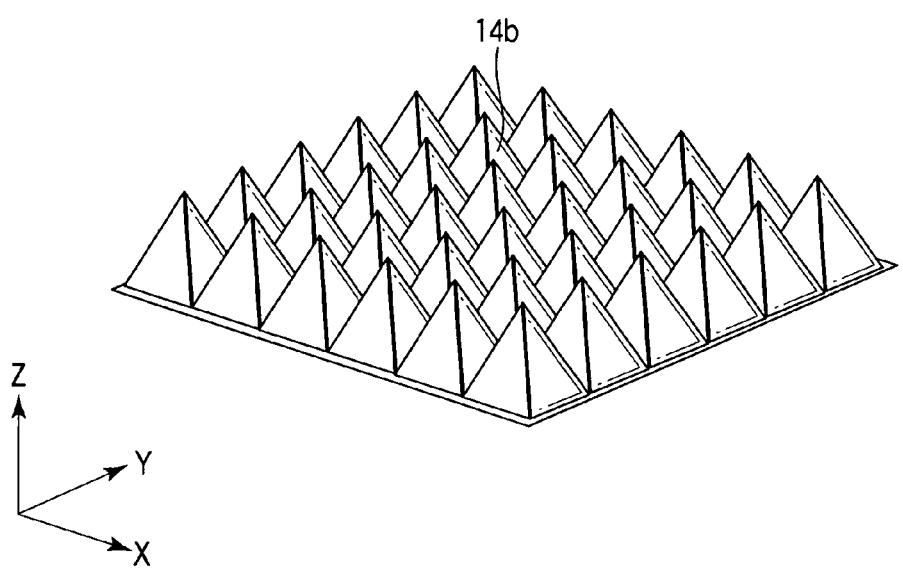
FIG. 13 is a perspective view showing, in an enlarging manner, another example of a relief-structured region that can be employed in the present invention.

10 . . . display, 11 . . . light-transmitting layer, 12a . . . relief-structured region, 12b . . . non-relief-structured region, 13 . . . reflection layer, 14a . . . recessed portion, 14b . . . protruding portion, 14c . . . intermediate portion, 16a . . . recessed line, 16b . . . protruding line, 31 . . . illumination light, 32 . . . regular reflected light or O-order diffracted light, 33 . . . 1st-order diffracted light, 51 . . . substrate, 52 . . . printed layer, 53 . . . magnetic recording layer, 100 . . . printed matter.

What is claimed is:

1. A display comprising:

a light-transmitting layer having main surfaces, one of the main surfaces including a relief-structured region as an image-constituting element, the relief-structured region including an intermediate portion, recessed portions, and protruding portions, the intermediate portion being a flat surface, the recessed portions being recessed with respect to the flat surface and arranged in first and second directions crossing each other, the protruding portions protruding from the flat surface and being arranged in the first and second directions; and a reflection layer supported by said one of the main surfaces and covering at least a part of the relief-structured region, wherein a center-to-center distance of the recessed portions and a center-to-center distance of the protruding portions fall within a range of 200 nm to 500 nm.

2. The display according to claim 1, wherein the one of the main surfaces includes multiple relief-structured regions, and a shape, depth or height, the center-to-center distance and an arrangement pattern of the recessed, or protruding portions in at least one of the relief-structured regions are different from those in other relief-structured region(s).

3. The display according to claim 1, wherein the one of the main surfaces includes multiple relief-structured regions, a shape, depth or height, the center-to-center distance and an arrangement pattern of the recessed, or protruding portions in at least one of the relief-structured regions are different from those in other relief-structured region(s), and the different relief-structured regions are arranged adjacent to each other.

4. The display according to claim 1, wherein the relief-structured region has recessed lines formed by the recessed portions and protruding lines formed by the protruding portions, the recessed lines have almost the same longitudinal direction as that of the protruding lines, and the recessed lines and the protruding lines are alternately arranged in a direction crossing the longitudinal direction.

5. The display according to claim 1, wherein the recessed portions are regularly arranged in the first direction at a first center-to-center distance and also regularly arranged in the second direction at a second center-to-center distance, and the protruding portions are regularly arranged in the first direction at the first center-to-center distance and also regularly arranged in the second direction at the second center-to-center distance.

6. The display according to claim 1, wherein the first and second center-to-center distances are different from each other.

7. The display according to claim 1, wherein the recessed, and protruding portions are arranged randomly.

8. The display according to claim 1, wherein the center-to-center distances are 400 nm or less.

9. The display according to claim 1, wherein the center-to-center distances fall within a range of 200 nm to 350 nm.

10. The display according to claim 1, wherein each of a depth of the recessed portions and a height of the protruding portions is equal to or greater than half the center-to-center distance.

11. The display according to claim 1, further comprising a resin layer, the reflection layer covering a part of the relief-structured region, the resin layer covering another part of the relief-structured region.

12. A labeled article comprising:
the display according to claim 1; and
an article supporting the display.

* * * * *